(12) United States Patent
Desai et al.

(10) Patent No.: US 11,522,608 B1
(45) Date of Patent: Dec. 6, 2022

(54) GEOSPATIAL COORDINATE PROVISIONING USING LIFI

(71) Applicant: Cisco Technology, Inc., San Jose, CA (US)

(72) Inventors: Vishal S. Desai, San Jose, CA (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/305,017

(22) Filed: Jun. 29, 2021

(51) Int. Cl.
*H04B 10/116* (2013.01)
*H04B 17/318* (2015.01)
*H04B 10/40* (2013.01)
*H04W 4/80* (2018.01)
*H04B 10/50* (2013.01)

(52) U.S. Cl.
CPC ........... *H04B 10/116* (2013.01); *H04B 10/40* (2013.01); *H04B 10/502* (2013.01); *H04B 17/318* (2015.01); *H04W 4/80* (2018.02)

(58) Field of Classification Search
CPC .... H04B 10/116; H04B 10/40; H04B 10/502; H04B 17/318; H04W 4/80
USPC ........................................................ 398/172
See application file for complete search history.

(56) References Cited

U.S. PATENT DOCUMENTS

| | | | |
|---|---|---|---|
| 9,813,150 B1 * | 11/2017 | Bitra ..................... | H04B 10/116 |
| 9,857,162 B1 * | 1/2018 | Gum ........................ | G01S 5/16 |
| 10,505,631 B1 * | 12/2019 | Sundar Pal ............. | H04L 27/26 |
| 2012/0091896 A1 * | 4/2012 | Schenk ................. | H05B 47/175 |
| | | | 315/132 |
| 2014/0280316 A1 * | 9/2014 | Gan ....................... | H04W 4/029 |
| | | | 707/769 |
| 2014/0375982 A1 | 12/2014 | Jovicic et al. | |
| 2015/0147067 A1 * | 5/2015 | Ryan ....................... | H04L 67/12 |
| | | | 398/118 |
| 2016/0165694 A1 | 6/2016 | Pederson | |
| 2016/0269112 A1 | 9/2016 | Guo et al. | |
| 2018/0306899 A1 | 10/2018 | Ryan et al. | |
| 2019/0052787 A1 * | 2/2019 | Oshima ................ | H04N 5/2356 |
| 2020/0367020 A1 * | 11/2020 | Ansley ................ | G01S 5/02521 |
| 2021/0136273 A1 | 5/2021 | Oshima et al. | |
| 2021/0365035 A1 * | 11/2021 | Verbrugh ............. | G05D 1/0234 |

OTHER PUBLICATIONS

Lifi.co, "What is GEOLIFI,", 7 pages, Accessed Online Jun. 28, 2021 <https://lifi.co/what-is-geolifi/>.
Cisco User Guide, "Cisco Aironet Universal AP Priming and Cisco AirProvision," Updated May 11, 2016, 42 pages.

(Continued)

*Primary Examiner* — Dalzid E Singh

(74) *Attorney, Agent, or Firm* — Patterson + Sheridan, LLP

(57) ABSTRACT

A method includes detecting, by a mobile device, a light sequence emitted from a plurality of light emitting diodes on an access point and determining, by the mobile device, an identifier for the access point based on the light sequence. The method also includes reporting, by the mobile device, a geospatial location of the mobile device and the identifier for the access point to an automated frequency coordination (AFC) server to perform AFC for the access point.

20 Claims, 3 Drawing Sheets

(56) References Cited

OTHER PUBLICATIONS

Cisco Systems, "User Guide for Cisco Catalyst Wireless Mobile Application," Published Jan. 19, 2020, Modified Mar. 16, 2020, 34 pages.
Techmesh, "Flashing Light Instead of QR Codes," Accessed Online Jun. 28, 2021 https://techmash.co.uk/2012/04/26/flashing-light-instead-of-qr-codes/.
X. Chen, A. Peng and B. Tang, "Automatic Radio Map Adaptation for WiFi Fingerprint Positioning Systems," 2020 5th International Conference on Communication, Image and Signal Processing (CCISP), 2020, pp. 64-69, doi: 10.1109/CCISP51026.2020.9273484.

* cited by examiner

GEOSPATIAL COORDINATE PROVISIONING USING LIFI

TECHNICAL FIELD

Embodiments presented in this disclosure generally relate to automated frequency coordination (AFC). More specifically, embodiments disclosed herein relate to geospatial coordinate provisioning using LiFi for AFC.

BACKGROUND

Network access points use AFC to determine how to transmit and receive messages from connected devices without interfering with other access points in the vicinity (e.g., legacy access points on different floors of a building or in a neighboring building). AFC uses the geospatial location of the access points to determine whether the access points will interfere with other access points when transmitting. The geospatial location of an access point, however, may be difficult to determine, especially when the access point is positioned at a high location (e.g., on a high ceiling). In some instances, a user device beneath the access point may be used to approximate the location of the access point, but the access point may not have any identifying features that a user or the user device can use to identify the access point for the AFC process. It is also not effective to use measured signal strengths to identify the access point (e.g., by assuming that the access point is the access point corresponding to the highest signal strength), because it is often the case that the signal strength of an access point is very weak underneath or close to the access point.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes detecting, by a mobile device, a light sequence emitted from a plurality of light emitting diodes on an access point and determining, by the mobile device, an identifier for the access point based on the light sequence. The method also includes reporting, by the mobile device, a geospatial location of the mobile device and the identifier for the access point to an automated frequency coordination (AFC) server to perform AFC for the access point. Other embodiments include a device that performs this method.

According to another embodiment, a method includes receiving, at an access point, an indication of a light sequence that represents an identifier of the access point and emitting, by a plurality of light emitting diodes on the access point, the light sequence. The method also includes receiving, at the access point, a number of channels that the access point is allowed to use for transmission, wherein the number of channels is determined through an AFC process based on the identifier decoded from the light sequence. Other embodiments include a device that performs this method.

EXAMPLE EMBODIMENTS

This disclosure describes using LiFi to determine the identity of an access point. A network controller assigns a unique light sequence to an access point. The access point uses light emitting diodes to emit the light sequence. A user device underneath or near the access point detects the light sequence and decodes the light sequence to determine an identifier for the access point. The user device then communicates the identifier for the access point and the geospatial coordinates of the user device to an AFC server. The AFC server then performs AFC for the access point using the geospatial coordinates of the user device and informs the access point how to communicate (e.g., number of channels to use, allowed frequencies, and power budgets) to minimize interference with other access points.

Figure 1:
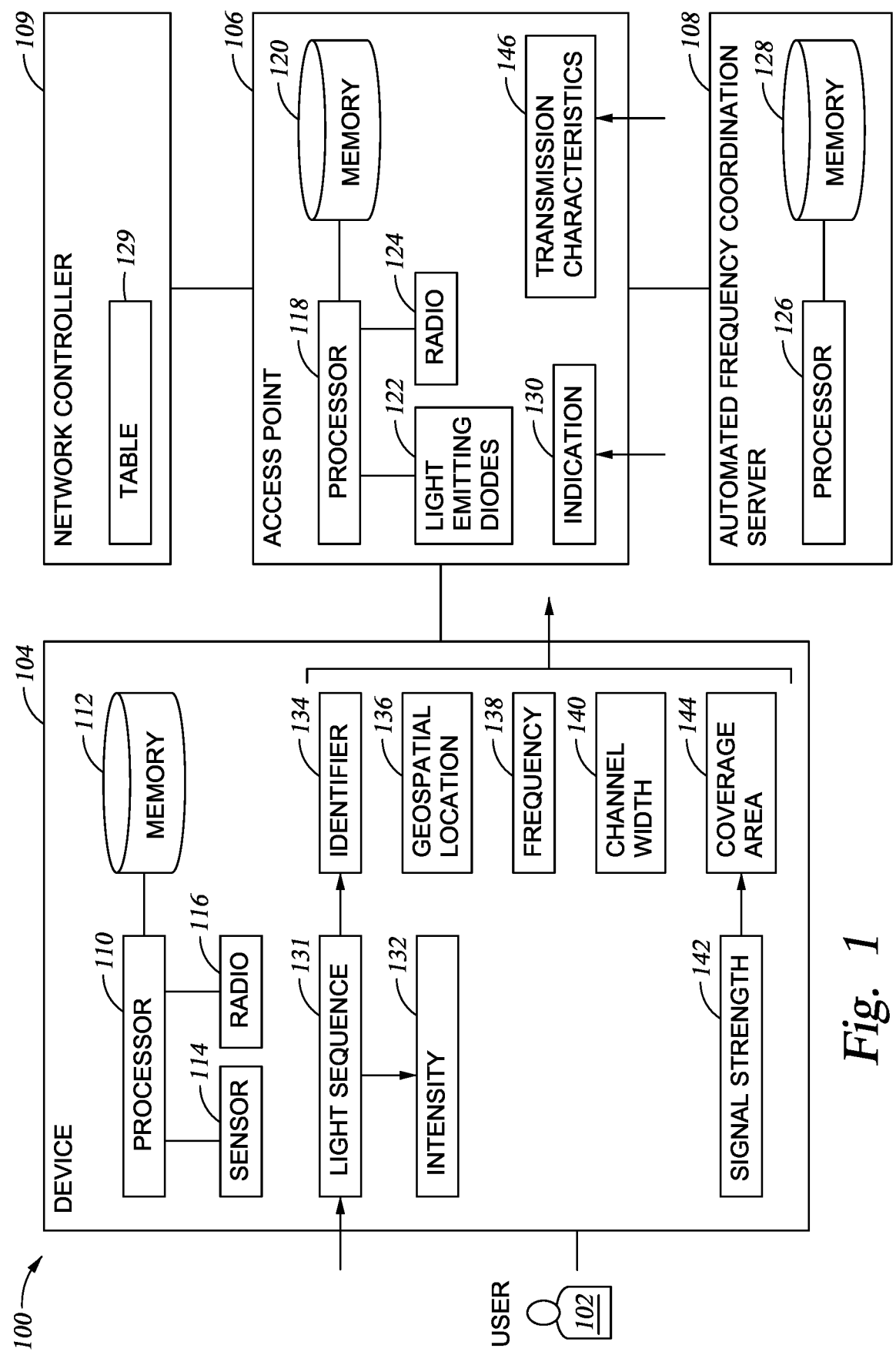
FIG. 1 illustrates an example system.

FIG. 1 illustrates an example system 100 as seen in FIG. 1. The system 100 includes one or more devices 104, an access point 106, an AFC server 108, and a network controller 109. Generally, the components of the system 100 operate to perform an AFC process for the access point 106. The access point 106 emits a light sequence that identifies the access point 106. The device 104 detects the light sequence and determines an identifier for the access point 106 based on the light sequence. The device 104 then uses the identifier and the geospatial location of the device 104 to perform the AFC process for the access point 106. In this manner, the AFC process may be performed for the access point 106 even though the geospatial location of the access point 106 is not known and even though the identifier for the access point 106 is not readily visible, in particular embodiments.

A user 102 uses the device 104 to determine an identifier for the access point 106 and to initiate an AFC process for the access point 106 using the geospatial location of the device 104. The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. As seen in FIG. 1, the device 104 includes a processor 110, a memory 112, a sensor 114, and a radio 116, which are configured to perform any of the functions or actions of the device 104 described herein. For example, a software application designed using software code may be stored in the memory 112 and executed by the processor 110 to perform the functions of the device 104.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the access point 106, network controller 109, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The device 104 includes any suitable number of sensors 114 that detect light sequences emitted by the access point 106. For example, a sensor 114 may be a camera or optical sensor that receives light signals from the access point 106. The device 104 then analyzes the light signals to determine the light sequence emitted by the access point 106. The device 104 may detect colors, intensities, durations, and/or frequencies of the light signal to determine the light sequence.

The device 104 includes any suitable number of radios 116. The radios 116 are communicatively coupled to the processor 110. The processor 110 uses the radios 116 to transmit and receive messages from another device in the system 100 (e.g., the access point 106). For example, the radio 116 may establish a wireless link with the access point 106. The device 104 then transmits messages to and receives messages from the access point 106 over the link.

The access point 106 provides the device 104 access to a network when the device 104 is connected to the access point 106. As seen in FIG. 1, the access point 106 includes a processor 118, a memory 120, light emitting diodes 122, and a radio 124, which are configured to perform any of the actions or functions of the access point 106 described herein.

The processor 118 is any electronic circuitry, including, but not limited to one or a combination of microprocessors, microcontrollers, application specific integrated circuits (ASIC), application specific instruction set processor (ASIP), and/or state machines, that communicatively couples to memory 120 and controls the operation of the access point 106. The processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 118 may include other hardware that operates software to control and process information. The processor 118 executes software stored on the memory 120 to perform any of the functions described herein. The processor 118 controls the operation and administration of the access point 106 by processing information (e.g., information received from the device 104, network controller 109, and memory 120). The processor 118 is not limited to a single processing device and may encompass multiple processing devices.

The memory 120 may store, either permanently or temporarily, data, operational software, or other information for the processor 118. The memory 120 may include any one or a combination of volatile or non-volatile local or remote devices suitable for storing information. For example, the memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 120, a disk, a CD, or a flash drive. In particular embodiments, the software may include an application executable by the processor 118 to perform one or more of the functions described herein.

The light emitting diodes 122 activate and deactivate to produce light signals. The light emitting diodes 122 may each emit light of any suitable color or duration. For example, the light emitting diodes 122 may be tricolor light emitting diodes. The access point 106 uses the light emitting diodes 122 to emit a light sequence that identifies the access point 106. For example, the light sequence may include a color pattern and/or intensity that is unique to the access point 106. The device 104 detects the light sequence and determines an identifier for the access point 106 based on the emitted light sequence.

The access point 106 includes any suitable number of radios 124. The radios 124 are communicatively coupled to the processor 118. The processor 118 uses the radios 124 to transmit and receive messages from another device in the system 100 (e.g., the device 104). For example, the radio 124 may establish a wireless link with the radio 116 of the device 104. The access point 106 then transmits messages to and receives messages from the device 104 over the link.

The AFC server 108 performs an AFC process for the access point 106 to determine certain transmission characteristics to which the access point 106 may adhere to avoid or minimize interference with other access points in the vicinity of the access point 106. Generally, the AFC server 108 uses an identifier and a geospatial location of the access point 106 to perform the AFC process. The AFC server determines other access points that are near the geospatial location and the characteristics of the other access points. The AFC server 108 then determines transmission characteristics for the access point 106 that, if followed, would avoid or minimize interfering with the other access points that are near the geospatial location. As seen in FIG. 1, the AFC server 108 includes a processor 126 and a memory 128, which are configured to perform any of the functions or actions of the AFC server 108 described herein.

The processor 126 is any electronic circuitry, including, but not limited to one or a combination of microprocessors, microcontrollers, application specific integrated circuits (ASIC), application specific instruction set processor (ASIP), and/or state machines, that communicatively couples to memory 128 and controls the operation of the AFC server 108. The processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 126 may include other hardware that operates software to control and process information. The processor 126 executes software stored on the memory 128 to perform any of the functions described herein. The processor 126 controls the operation and administration of the AFC server 108 by processing information (e.g., information received from the device 104, access point 106, and memory 128). The processor 126 is not limited to a single processing device and may encompass multiple processing devices.

The memory 128 may store, either permanently or temporarily, data, operational software, or other information for the processor 126. The memory 128 may include any one or a combination of volatile or non-volatile local or remote devices suitable for storing information. For example, the memory 128 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 128, a disk, a CD, or a flash drive. In particular embodiments, the software may include an application executable by the processor 126 to perform one or more of the functions described herein.

The network controller 109 assigns light sequences to the access points 106 in the system 100. As seen in FIG. 1, the network controller 109 maintains a table 129 that maps identifiers for access points 106 with light sequences that are assigned to those access points 106. In certain embodiments, the light sequences assigned to the access points 106 are unique to their respective access points 106. The network controller 109 communicates to the access point 106 the light sequence that is assigned to the access point 106. The access point 106 then emits the light sequence using the light emitting diodes 122. The device 104 detects the emitted light sequence. The device 104 may then communicate the detected light sequence to the network controller 109. The network controller 109 then references the table 129 using the detected light sequence to determine the identifier for the access point 106. The network controller 109 then communicates the identifier for the access point 106 to the device 104. In this manner, the network controller 109 facilitates the identification of the access point 106.

The device 104, the access point 106, the AFC server 108, and the network controller 109 operate together to perform an AFC process for the access point 106. The operation begins with the network controller 109 assigning a light sequence to the access point 106. In particular embodiments, the light sequence for the access point 106 is unique to the access point 106 within the system 100. The network controller 109 communicates an indication 130 to the access point 106. The indication 130 indicates the light sequence that identifies the access point 106. The network controller 109 also stores the light sequence along with an identifier for the access point 106 in the table 129.

The access point 106 then emits the light sequence using the light emitting diodes 122. The device 104 may be positioned underneath or close to the access point 106. The sensor 114 in the device 104 detects the light sequence 131 emitted by the light emitting diodes 122. The light sequence 131 may include any suitable type of light, such as visible light and non-visible light (e.g., infrared light and ultraviolet light). In some embodiments, the sensor 114 also detects an intensity 132 of the light sequence 131. For example, the sensor 114 may detect that the light sequence 131 includes a certain color pattern with certain intensities. The device 104 uses the light sequence and/or the intensity 132 to determine an identifier 134 for the access point 106. In particular embodiments, the device 104 communicates a message to the network controller 109 indicating the light sequence 131 and/or the intensity 132. For example, the message may indicate a color pattern in the light sequence 131 and the intensity 132. The network controller 109 references the table 129 using the light sequence 131 and/or the intensity 132 to determine the identifier 134 corresponding to the light sequence 131 and/or the intensity 132. The network controller 109 then communicates the identifier 134 to the device 104. In certain embodiments, the identifier 134 includes a name of the access point 106 and/or an owner of the access point 106. The components of the system 100 may use the identifier 134 to identify the access point 106 and/or the owner of the access point 106.

The device 104 then determines a geospatial location 136 of the device 104. In particular embodiments, the device 104 uses a global positioning system (not shown) to determine the geospatial location 136 of the device 134. The geospatial location 136 may include coordinates that indicate a geographical location of the device 104. Because the device 104 is underneath or near the access point 106, the geospatial location 136 of the device 104 may be substituted for the geospatial location of the access point 106 during the AFC process.

In particular embodiments, the device 104 detects a frequency 138 and/or a channel width 140 of the access point 106. For example, the device 104 may use the radio 116 to connect to the radio 124 of the access point 106. The device 104 then detects the frequency 138 and/or the channel width 140 used by the access point 106 and the radio 124 to communicate messages with the device 104. The device 104 then communicates the frequency 138 and/or the channel width 140 as part of the AFC process. The frequency 138 and/or the channel width 140 may be used to determine the other access points that are affected by transmissions using the frequency 138 and/or the channel width 140. For example, if another access point is transmitting with a frequency that is close to the frequency 138 and/or with a channel whose width overlaps with the channel of the access point 106, then transmissions from the access point 106 may interfere with the other access point.

In certain embodiments, the device 104 determines a signal strength 142 of the access point 106. For example, the device 104 may use the radio 116 to connect to the radio 124 of the access point 106. The device 104 then measures a signal strength of signals communicated by the access point 106 to the device 104. Based on the signal strength 142, the device 104 determines a coverage area 144 of the access point 106. The larger the signal strength 142, the larger the coverage area 144. The device 104 communicates the coverage area 144 as part of the AFC process. The coverage area 144 may be used to determine the other access points that are within the coverage area 144 of the access point 106.

The device 104 communicates the identifier 134 and the geospatial location 136 to the AFC server 108 to initiate an AFC process for the access point 106. The AFC server 108 uses the identifier 134 and the geospatial location 136 to determine other access points within the vicinity of the access point 106. In certain embodiments, the device 104 also communicates the frequency 138 and/or the channel width 140 to the AFC server 108. The AFC process uses the frequency 138 and/or the channel width 140 to determine if other access points are using similar frequencies or channels to the access point 106. In some embodiments, the device 104 also communicates the coverage area 144 of the access point 106 to the AFC server 108. The AFC server 108 uses the coverage area 144 of the access point 106 to determine if other access points are within the coverage area 144 of the access point 106. The AFC server 108 uses the information communicated by the device 104 to perform the AFC process and to determine transmission characteristics 146 that, if implemented by the access point 106, would avoid or minimize interference with other access points. The transmission characteristics 146 may include frequency limitations, channel limitations, and/or power budgets. The AFC server 108 communicates the transmission characteristics 146 to the access point 106 (e.g., the access point corresponding to the identifier 134).

The access point 106 receives the transmission characteristics 146 and adjusts the operation of the access point 106 according to the transmission characteristics 146. For example, if the transmission characteristics 146 limit the access point 106 to transmitting using certain frequencies, then the access point 106 transmits using only the frequencies indicated by the transmission characteristics 146. As another example, if the transmission characteristics 146 limit the number of channels that the access point 106 may use, then the access point 106 adjusts its transmissions to use only the channels indicated by the transmission characteristics 146. As yet another example, if the transmission characteristics 146 sets certain power budgets, then the access point 106 adjusts its transmissions to be within the power budgets indicated by the transmission characteristics 146. In this manner, the components of the system 100 operate together to perform an AFC process for the access point 106 even though the geospatial location of the access point 106 is not readily known.

Figure 2:
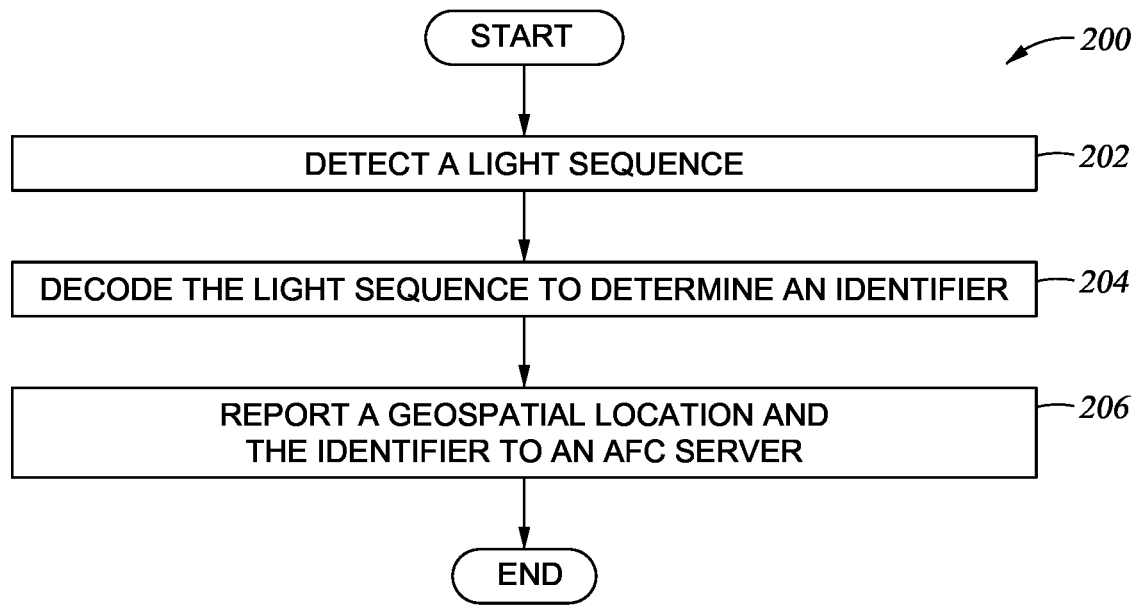
FIG. 2 is a flowchart of an example method performed in the system of FIG. 1.

FIG. 2 is a flowchart of an example method 200 performed in the system 100 of FIG. 1. The device 104 performs the method 200. In particular embodiments, by performing the method 200, the device 104 initiates an AFC process for the access point 106 without knowing the geospatial location of the access point 106.

In block 202, the device 104 detects a light sequence 131. A user 102 may position the device 104 near or beneath the access point 106. The user 102 then launches on the device 104 an application for initiating the AFC process. The user 102 then directs a sensor 114 (e.g., a camera) of the device 104 towards the access point 106 to detect the light sequence 131. The light sequence 131 may have been emitted by the light emitting diodes 122 of the access point 106. The light sequence 131 may uniquely identify the access point 106. In some embodiments, the light sequence 131 includes a color pattern and/or an intensity 132.

In block 204, the device 104 decodes the light sequence 131 (e.g., with the assistance of the network controller 109) to determine the identifier 134. In certain embodiments, the device 104 communicates the light sequence 131 and/or the intensity 132 to the network controller 109. The network controller 109 then references the table 129 using the light sequence 131 and/or the intensity 132 to determine the identifier 134 for the access point 106. The network controller 109 then communicates the identifier 134 to the device 104. In some embodiments, the network controller 109 communicates the table 129 to the device 104. The device 104 then references the table 129 using the light sequence 131 and/or the intensity 132 to determine the identifier 134 of the access point 106.

In block 206, the device 104 reports a geospatial location 136 of the device 104 and the identifier 134 to an AFC server 108 so that the AFC server 108 can perform an AFC process for the access point 106 using the geospatial location 136 of the device 104. In some embodiments, the device 104 determines the geospatial location 136 of the device 104 using a global positioning system (GPS). The geospatial location 136 of the device 104 substitutes as the geospatial location of the access point 106, because the device 104 is positioned beneath or near the access point 106.

Figure 3:
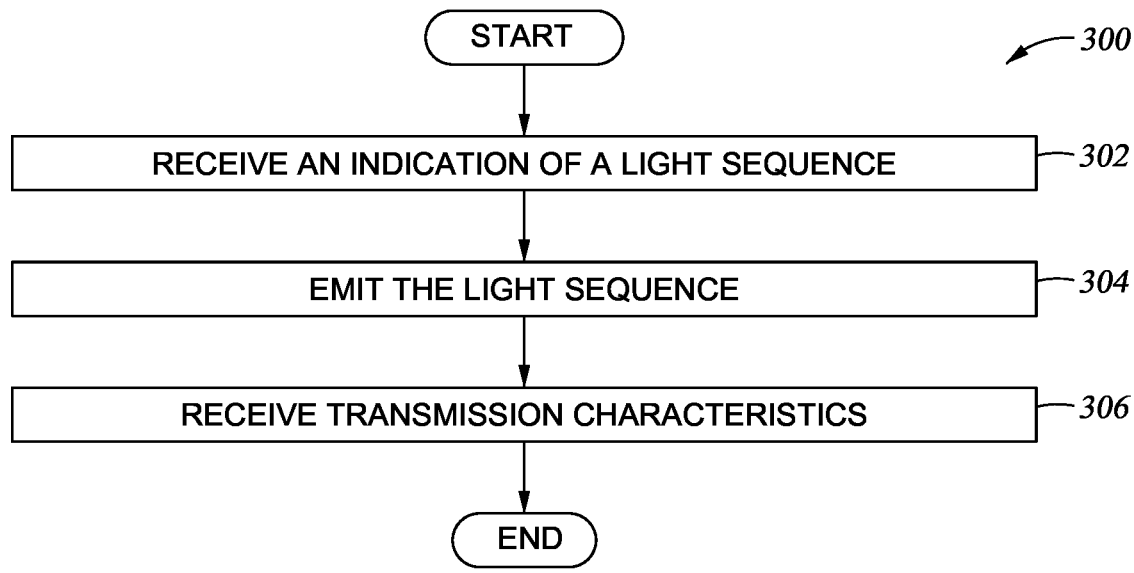
FIG. 3 is a flowchart of an example method performed in the system of FIG. 1.

FIG. 3 is a flowchart of an example method 300 performed in the system 100 of FIG. 1. The access point 106 performs the method 300 in particular embodiments. By performing the method 300, the access point 106 identifies itself, even if an identifier on the body of the access point 106 is not readily visible or available.

In block 302, the access point 106 receives an indication 130 of a light sequence 131. The indication 130 indicates or provides a light sequence 131 to be used by the access point 106 to identify itself. The access point 106 may receive the indication 130 from the network controller 109 when the access point 106 is installed on the network serviced by the network controller 109. After the access point 106 identifies itself to the network controller 109, the network controller 109 assigns the light sequence 131 to the access point 106 and communicates the indication 130 to the access point 106 to indicate to the access point 106 the light sequence 131 that the access point 106 should use to identify itself. In block 304, the access point 106 uses the light emitting diodes 122 to emit the light sequence 131 in the indication 130. The access point 106 thus identifies itself to the device 104 using the emitted light sequence 131.

In block 306, the access point 106 receives transmission characteristics 146 from the AFC server 108. The transmission characteristics 146 may have been determined based on an AFC process using the geospatial location 136 of the device 104 as a proxy location for the access point 106. The access point 106 adjusts its operation according to the transmission characteristics 146 so as to avoid or minimize interference with other access points. For example, if the transmission characteristics 146 limit the frequencies that the access point 106 can use, then the access point 106 adjusts its operation so that the access point 106 transmits using only the frequencies indicated in the transmission characteristics 146. As another example, if the transmission characteristics 146 limit the channels that the access point 106 may use, then the access point 106 adjusts its operation to transmit using only the channels indicated in the transmission characteristics 146. As yet another example, if the transmission characteristics 146 allot a power budget to the access point 106, then the access point 106 adjusts its transmission power to be within the power budget indicated by the transmission characteristics 146.

Figure 4:
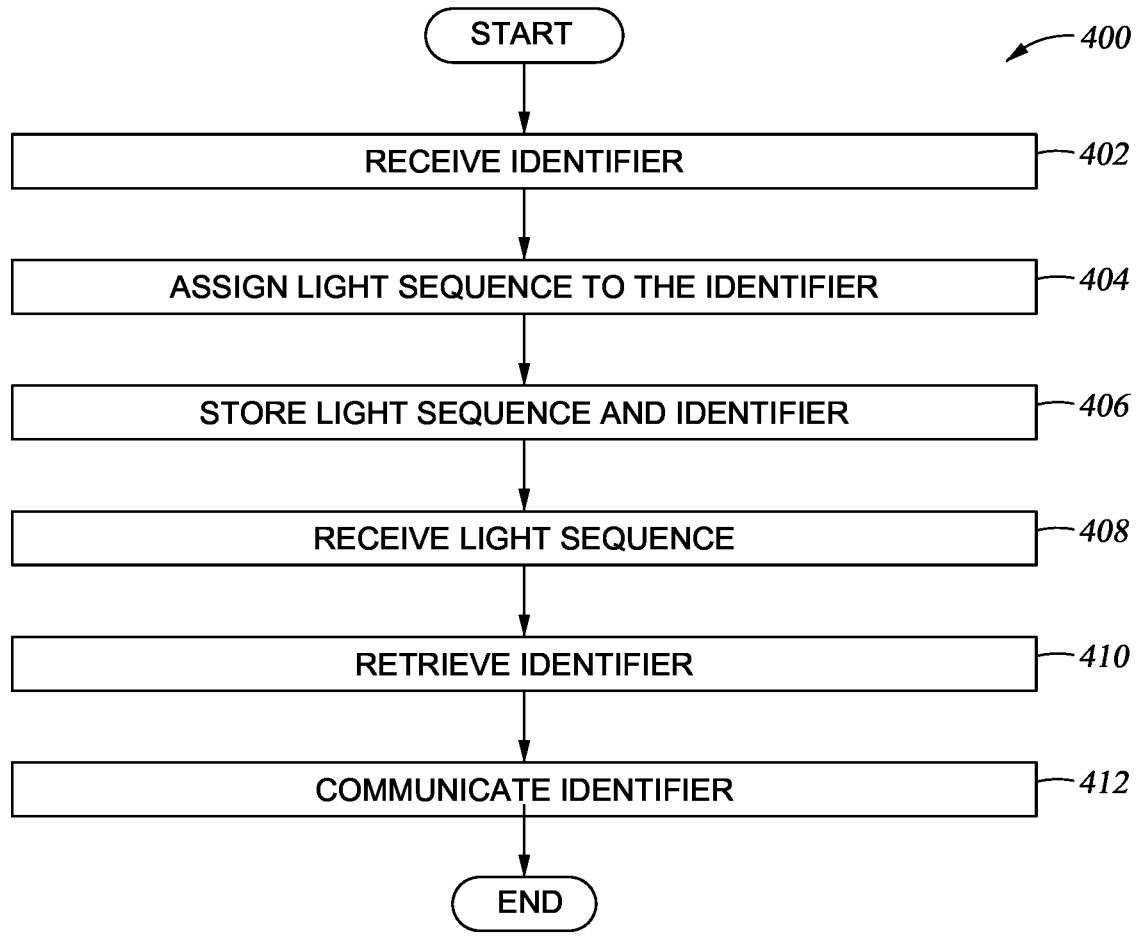
FIG. 4 is a flowchart of an example method performed in the system of FIG. 1.

FIG. 4 is a flowchart of an example method 400 performed in the system 100 of FIG. 1. The network controller 109 performs the method 400. In particular embodiments, by performing the method 400, the network controller 109 identifies the access point 106 using a light sequence 131.

In block 402, the network controller 109 receives an identifier 134 from the access point 106. For example, the access point 106 may communicate a name for the access point 106 and/or the identity of an owner of the access point 106 to the network controller 109 when the access point 106 is installed in a network serviced by the network controller 109. The identifier 134 may be unique to the access point 106 in the system 100. The network controller 109 then assigns a light sequence 131 to the identifier 134 received from the access point 106 in block 404. In certain embodiments, the light sequence 131 assigned to the identifier 134 may be unique to the access point 106 within the system 100. In block 406, the network controller 109 stores the light sequence 131 and the identifier 134 in the table 129. The network controller 109 may then use the table 129 to identify the access point 106 based on the light sequence 131.

In block 408, the network controller 109 receives a light sequence 131 detected by the device 104 (e.g., according to block 202 in the method 200). The access point 106 may have emitted the light sequence 131 using the light emitting diodes 122. The device 104 uses the sensor 114 (e.g., a camera) to detect the light sequence 131. The device 104 then decodes the light sequence 131 with the assistance of the network controller 109. For example, the device 104 may communicate the light sequence 131 to the network controller 109. In block 410, the network controller 109 retrieves the identifier 134 for the access point 106 using the table 129. The network controller 109 references the table 129 using the light sequence 131 received from the device 104. In block 412, the network controller 109 communicates the identifier 134 to the device 104 so that the device 104 can initiate an AFC process using the identifier 134. In some embodiments, the network controller 109 communicates the table 129 to the device 104, and the device 104 references the table 129 directly to decode the light sequence 131.

In summary, the system 100 uses LiFi to determine the identity of an access point 106. A network controller 109 assigns a unique light sequence 131 to an access point 106. The access point 106 uses light emitting diodes 122 to emit the light sequence 131. A user device 104 underneath or near the access point 106 detects the light sequence 131 and decodes the light sequence 131 to determine an identifier 134 for the access point 106. The user device 104 then communicates the identifier 134 for the access point 106 and the geospatial coordinates 136 of the user device 104 to an AFC server 108. The AFC server 108 then performs AFC for the access point 106 using the geospatial coordinates 136 of the user device 104 and informs the access point 106 how to communicate (e.g., number of channels to use, allowed frequencies, and power budgets) to minimize interference with other access points.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   detecting, by a mobile device, a light sequence emitted from a plurality of light emitting diodes on an access point;
   determining, by the mobile device, an identifier for the access point based on the light sequence; and
   reporting, by the mobile device, a geospatial location of the mobile device and the identifier for the access point to an automated frequency coordination (AFC) server to perform AFC for the access point.

2. The method of claim 1, further comprising:
   detecting, by the mobile device, one of a frequency or a channel width of the access point; and
   reporting one of the frequency or the channel width of the access point to the AFC server.

3. The method of claim 1, further comprising:
   detecting, by the mobile device, a signal strength of the access point;
   determining a coverage area of the access point based on the signal strength; and
   reporting the coverage area to the AFC server.

4. The method of claim 1, further comprising determining one of an intensity or a color of the light sequence, wherein determining the identifier for the access point is based on one of the intensity or the color.

5. The method of claim 1, wherein the light sequence is emitted as part of LiFi.

6. The method of claim 1, wherein the geospatial location of the mobile device is used as a proxy for a geospatial location of the access point during AFC for the access point.

7. The method of claim 1, wherein the mobile device is positioned beneath the access point when detecting the light sequence.

8. A mobile device comprising:
   a memory; and
   a hardware processor communicatively coupled to the memory, the hardware processor configured to:
      detect a light sequence emitted from a plurality of light emitting diodes on an access point;
      determine an identifier for the access point based on the light sequence; and
      report a geospatial location of the mobile device and the identifier for the access point to an AFC server to perform AFC for the access point.

9. The mobile device of claim 8, the hardware processor further configured to:
   detect one of a frequency or a channel width of the access point; and
   report one of the frequency or the channel width of the access point to the AFC server.

10. The mobile device of claim 8, the hardware processor further configured to:
    detect a signal strength of the access point;
    determine a coverage area of the access point based on the signal strength; and
    report the coverage area to the AFC server.

11. The mobile device of claim 8, the hardware processor further configured to determine one of an intensity or a color of the light sequence, wherein determining the identifier for the access point is based on one of the intensity or the color.

12. The mobile device of claim 8, wherein the light sequence is emitted as part of LiFi.

13. The mobile device of claim 8, wherein the geospatial location of the mobile device is used as a proxy for a geospatial location of the access point during AFC for the access point.

14. The mobile device of claim 8, wherein the mobile device is positioned beneath the access point when detecting the light sequence.

15. A method comprising:
    receiving, at an access point, an indication of a light sequence that represents an identifier of the access point;
    emitting, by a plurality of light emitting diodes on the access point, the light sequence; and
    receiving, at the access point, a number of channels that the access point is allowed to use for transmission, wherein the number of channels is determined through an AFC process based on the identifier decoded from the light sequence.

16. The method of claim 15, wherein the AFC process is further based on one of a frequency or a channel width of the access point.

17. The method of claim 15, wherein the AFC process is further based on a coverage area of the access point.

18. The method of claim 15, wherein the indication of the light sequence further indicates one of an intensity or a color of the light sequence.

19. The method of claim 15, wherein the light sequence is emitted as part of LiFi.

20. The method of claim 15, wherein the AFC process is further based on a geospatial location of a mobile device separate from the access point.

* * * * *